United States Patent
Chen et al.

(10) Patent No.: US 9,258,547 B2
(45) Date of Patent: Feb. 9, 2016

(54) INTELLIGENT DEVICE WITH BOTH RECORDING AND PLAYING BACK 3D MOVIES AND THE RELEVANT APPARATUS AND METHODS

(71) Applicants: Laurence Lujun Chen, Hayward, CA (US); Di (Laura) Chen, Xi'an (CN); Jie Guo, Hanyin (CN); Michael Meng Chen, Hayward, CA (US)

(72) Inventors: Laurence Lujun Chen, Hayward, CA (US); Di (Laura) Chen, Xi'an (CN); Jie Guo, Hanyin (CN); Michael Meng Chen, Hayward, CA (US)

(73) Assignee: Laurence Chen, Hayward, CA (US)

( * ) Notice: Subject to any disclaimer, the term of this patent is extended or adjusted under 35 U.S.C. 154(b) by 108 days.

(21) Appl. No.: 13/844,976

(22) Filed: May 24, 2013

(65) Prior Publication Data
US 2014/0348490 A1    Nov. 27, 2014

(51) Int. Cl.
*H04N 13/02* (2006.01)
*H04N 13/04* (2006.01)

(52) U.S. Cl.
CPC ....... *H04N 13/0239* (2013.01); *H04N 13/0409* (2013.01); *H04N 13/0413* (2013.01); *H04N 13/0438* (2013.01); *H04N 13/0475* (2013.01); *H04N 13/0484* (2013.01); *H04N 2213/001* (2013.01)

(58) Field of Classification Search
CPC ...... H04N 13/0239; H04N 5/772; H04N 5/85
USPC ............ 348/14.08, 156, 158, 633, 42, 46, 51; 386/224, 248

See application file for complete search history.

(56) References Cited

U.S. PATENT DOCUMENTS

| | | | | |
|---|---|---|---|---|
| 2005/0219693 A1* | 10/2005 | Hartkop et al. | ................ | 359/462 |
| 2006/0192781 A1* | 8/2006 | Iwata et al. | .................... | 345/467 |
| 2009/0154550 A1* | 6/2009 | Aso et al. | ................. | 375/240.01 |
| 2011/0304612 A1* | 12/2011 | Ohyama | ........................ | 345/419 |
| 2013/0162521 A1* | 6/2013 | Lee et al. | ....................... | 345/156 |
| 2013/0242067 A1* | 9/2013 | Jeong et al. | ..................... | 348/54 |

* cited by examiner

Primary Examiner — Thai Tran
Assistant Examiner — Mishawn Hunter (57) ABSTRACT

Present invention relates to apparatus and methods for integrating both 3D video recording and 3D movies playing back together on intelligent devices or smart devices, wherein the method of the 3D movies recording can increase the view depth beyond human eye capability and the method and apparatus of 3D movies playing back provide large tolerance to eye motion and viewer is able to avoid the suffers from side effects of vertigo, headache, and eye fatigue; wherein intelligent devices is any one of cell-phone, PDA, iPhone / smartPhone, iPad, Google Glass, pocket/tablet PC, GPS, or eBook, laptop or notebook, computer, TV or iTV, etc.

9 Claims, 7 Drawing Sheets

INTELLIGENT DEVICE WITH BOTH RECORDING AND PLAYING BACK 3D MOVIES AND THE RELEVANT APPARATUS AND METHODS

CROSS-REFERENCE TO RELATED APPLICATION

The application claims the priority from U.S. provisional application No. U.S. 61/685,553, filed on Mar. 21, 2012 with post mail date on Mar. 17, 2012, and tilted "Apparatus and Method for Recording and Playing Back 3D Movies on Intelligent Devices".

FIELD OF INVENTION

Present invention relates to apparatus and methods for integrating both 3D movies recording and 3D movies playing back together on intelligent devices (ID) or smart devices, wherein the method of the 3D movies recording can increase the 3D view depth beyond human eye capability and the method and apparatus of 3D movies playing back provide large tolerance to eye motion and viewer is able to avoid the sufferings from side effects of vertigo, headache, and eye fatigue; wherein intelligent device is any one of cell-phone, PDA, iphone/smart phone, iPad, Google Glass, pocket/tablet PC, GPS, or eBook, laptop or notebook, computer, TV or iTV, etc.

BACKGROUND OF INVENTION

Even though there is one disclosure in the prior arts related to 3D camera system on mobile phone, and there are some discourse related to 3D display on mobile phone, this invention integrates 3D recording system and 3D playing back system together on intelligent device (ID), not only including mobile phone but also including iTV, smart phone, iPad, computer monitor, etc. Prior art 1, WO2012082124 (Al) by Sony, describes a 3D camera system, disposed on a mobile communication device, comprising two camera modules movable relative to each other between two positions. However, 3D view depth is very limited. By using the embodiment of this invention, 3D view depth can be greatly increased. The other prior arts describe different variations of 3D display, and the 3D displays described are eye-glass based or glassless based which mainly used simple parallax barrier or lenticular technologies, which have no tolerance for eye motion, and so viewer is easily suffering from side effects of vertigo, headache, and eye fatigue. This invention also provides large tolerance to eye motion and viewer is able to avoid the sufferings from these.

Related U.S. Patent Documents

| Patent/publish Number | Filing Date | inventors |
| --- | --- | --- |
| U.S-2005/0219693 | October 2005 | Hartkop et al |
| U.S-2006/0192781 | August 2006 | Iwata et al |
| U.S-2009/0154550 | June 2009 | Aso et al |
| U.S-2011/0304612 | December 2011 | Ohayama, Tsuyoshi |
| U.D-2013/0242067 | June 2013 | Lee et al |
| U.S-2013/02442067 | September 2013 | Jeong et al |

SUMMARY OF THE INVENTION

Present invention relates to intelligent device (ID) which integrates both recording and playing back 3D movies together into current intelligent /smart devices, and corresponding apparatus and methods for 3D movie recording and 3D movie playing back. A smart device is any one of cell-phone, PDA, iPhone / smart phone, iPad, Google Glass, pocket /tablet PC, GPS, or eBook, laptop or notebook, computer, TV or iTV, etc.

The apparatus for 3D movie recording includes at least one pair of cameras installed on back side of ID, or/and single camera or one camera pairs installed at front side (facing to user), and allows smart device users be able to record 3D movies or television episodes and play back on any 3D-enable display device or apparatus, including smart devices themselves, TV, computer monitors, but not limited to those.

The apparatus and method for 3D movie recording, when necessary, includes camera holder extension to increase the view depth beyond human eye capability.

The apparatus and method for playing-back 3D movie compresses display apparatus which includes image signal pixel-scanning-device and shutter grids, and compresses system and algorithm for process and control, of which detail will be described later, so that viewer is able to avoid the suffers from side effects of vertigo, headache, and eye fatigue.

With this 3D recording apparatus and built-in 3D playing back apparatus, ID users can enjoy their own-recorded 3D movies.

With this 3D recording apparatus and any other 3D-enable display ID, people can meet, or call meeting, or chat, or shop, or sell online as alive on smart phone, or on TV, or on iphone/smart phone, or on computer monitor, etc; Vendor can show product online or on the smart phone /ipad /tablet as alive, and customer can see the product details in 3D.

DETAIL DESCRIPTION OF THE INVENTION

Basic Configurations of 3D Recording Apparatus

Figure 1:
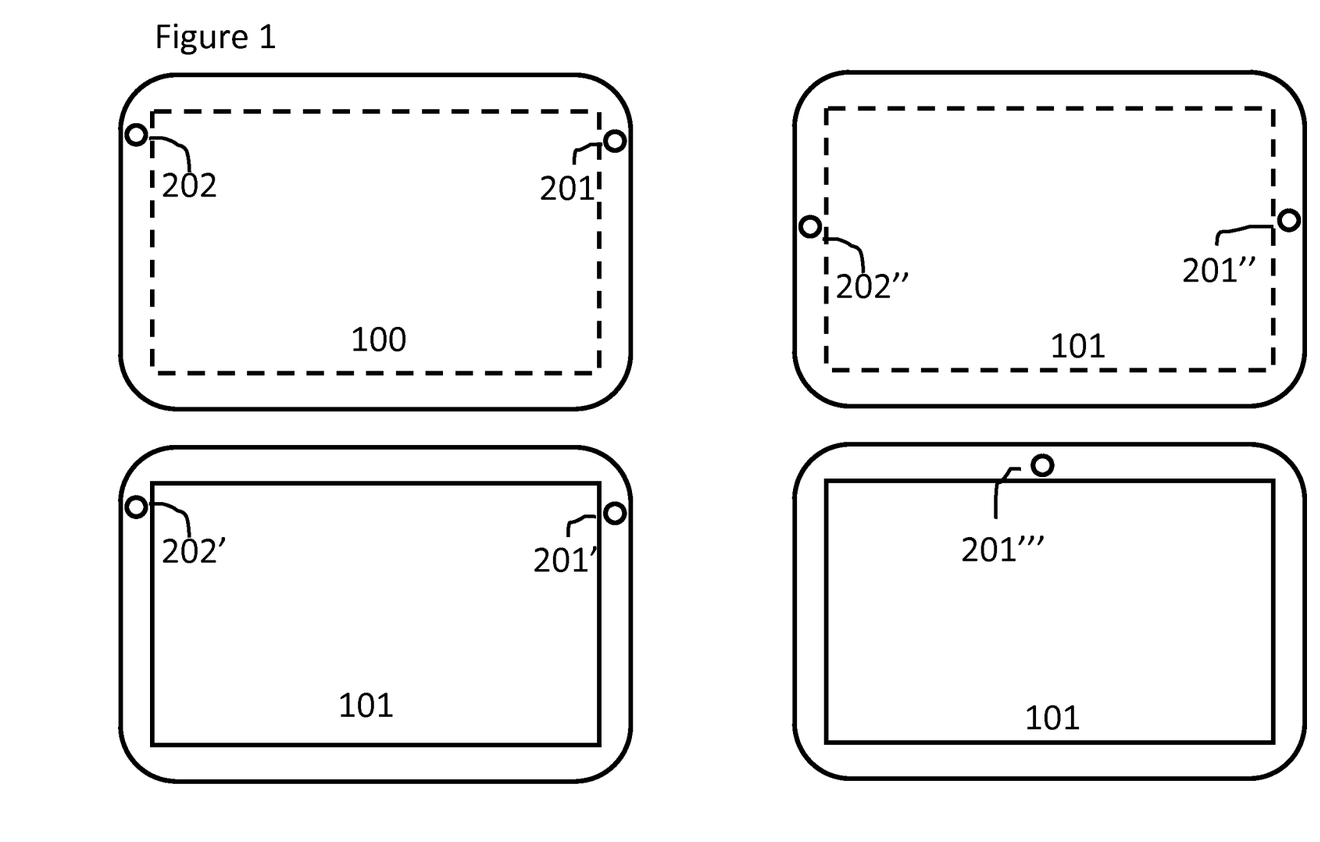

[1] The invented apparatus has at least one camera pair (201, 202) or (201", 202") installed on back side (100) (for recording), and / or another camera pair (201' and 202') or a single camera (201''') installed on front side (101) (facing to user) for eye tracking if single camera, or for eye to screen distance measurement plus eye-tracking if camera pair, and for other applications such as web dating, web meeting, web chatting, web selling and buying, etc., as shown in FIG. 1. The two cameras in any camera pair can synchronically record two pictures (at each moment) of front view or back view or both views (if with two pairs) at two different angles (adjustable), like two human-being's right eye and left eye seeing the views ahead.

[2] The two cameras in a pair are focus-adjustable simultaneously during 3D recording, for either numerical focusing or optic focusing.

[3] The two cameras in a pair are view-angle-adjustable simultaneously before or during 3D recording.

[4] Any camera in a pair or any pair can be located at arbitrary location, and the two cameras in a pair are not necessarily at same horizontal or vertical location (not shown in FIG. 1).

Configurationally Variations of 3D Recording Apparatus

[5] Typical human-being eye distance is about 7 cm to 10 cm, which leads to a typical 3D view depth of about 30 feet, means human-being eye can have distance sense ["far" or "close"] only for objects within 30 feet, for any object beyond this distance, human eye cannot tell it's distance if he/she has no knowledge about the relation of this object to the reference objects nearby, i.e. if we have some knowledge about the relation of an object to the objects nearby, we can tell the distance by our knowledge (not by view depth sense), such as, its relative looking-size [such as, if small—our brain was trained to think it is "far", if large means "close", because a real car cannot be the size of a toy car, and toy car cannot run on a road, so a car on a road looks small, that means it is "far", we never think it is a toy car on the road].

Figure 2:
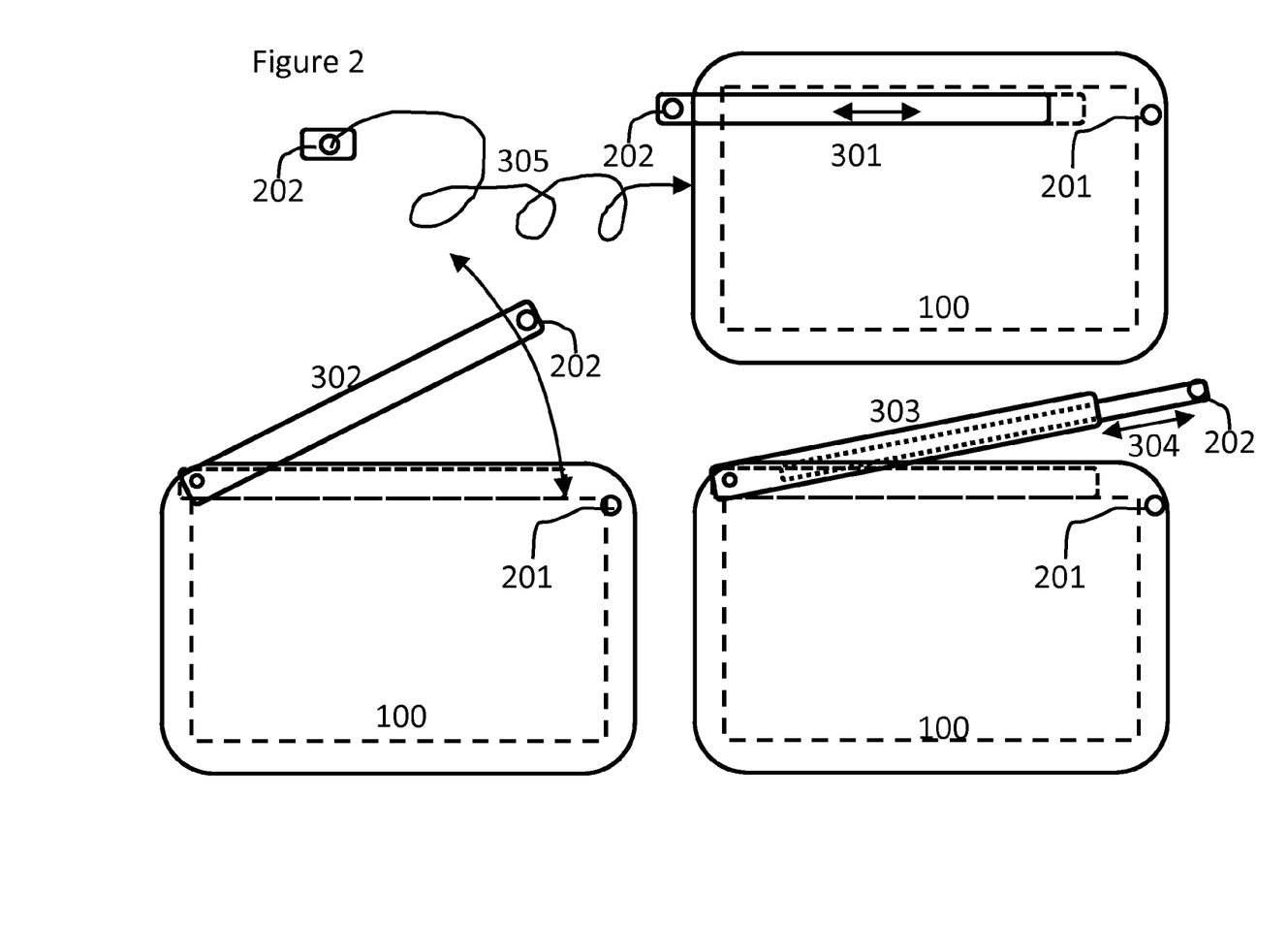

[6] For same reason, the distance of two cameras in pair should be large enough to have large enough view depth. To capture more 3D view, sometimes, we need to increase the view depth beyond human eye capability (say 3D view beyond 30 ft, 100 ft, 5000 ft, 50,000 ft, . . .). We introduce an extension (such as 301, or 302, or 303 and 304, or 305 as shown in FIG. 2, but not limited these examples) to achieve this goal, by extending the distance of cameras in a pair.

[7] The view depth can be extended roughly to [30 feet× (camera-distance / 8 cm)]. For example, if the camera distance is 24 cm, the view depth can increases to 90 feet.

[8] One end of extension 301 can slip out from ID to either side (right or left side, FIG. 2 only showing to the left, but it can be to the right also) of ID to adjust the camera distance, and camera is installed on one side of the extension, and the other camera in the pair installed on other side of ID.

[9] Extension 302 can be pulled out from ID and rotate any angle to adjust the camera distance, and camera is installed at one end of extension, and rotates about other end which is fixed on ID.

[10] Extension 304 can slip out from extension 303 or extension 302, or 301, to further increase the camera distance. Camera installed in the out-side end of extension 304,

[11] Extension can be an off-Device-camera . Extension 305 represents a link between off-Device-camera and ID, off-Device-camera is one of the cameras in a camera pair. This link could be any of optical fiber link, RF cable/wire, or RF wireless link, with recoding synchronic commands.

Movie Data Storage Method of 3D Recording

[12] Movie data, i.e. a set of pictures, recorded by the any pair of the camera for right eye and left eye are stored in separate data files, or are stored alternately right eye picture by left eye picture in same data file, with any predefined 3D movie format, or industry standard format.

Recoding camera function as the Cameras for 3D projector

[13] The two camera in camera pair can be used as 3D projector projecting cameras, so people can see 3D movie on ID screen or even on the wall (if with glass); People can have more convenience for alive conferences or meetings or seminar online.

Configurations and Methods of 3D Playing-Back

[14] The apparatus for playing-back 3D movie include display apparatus and shutter apparatus.

Figure 3:
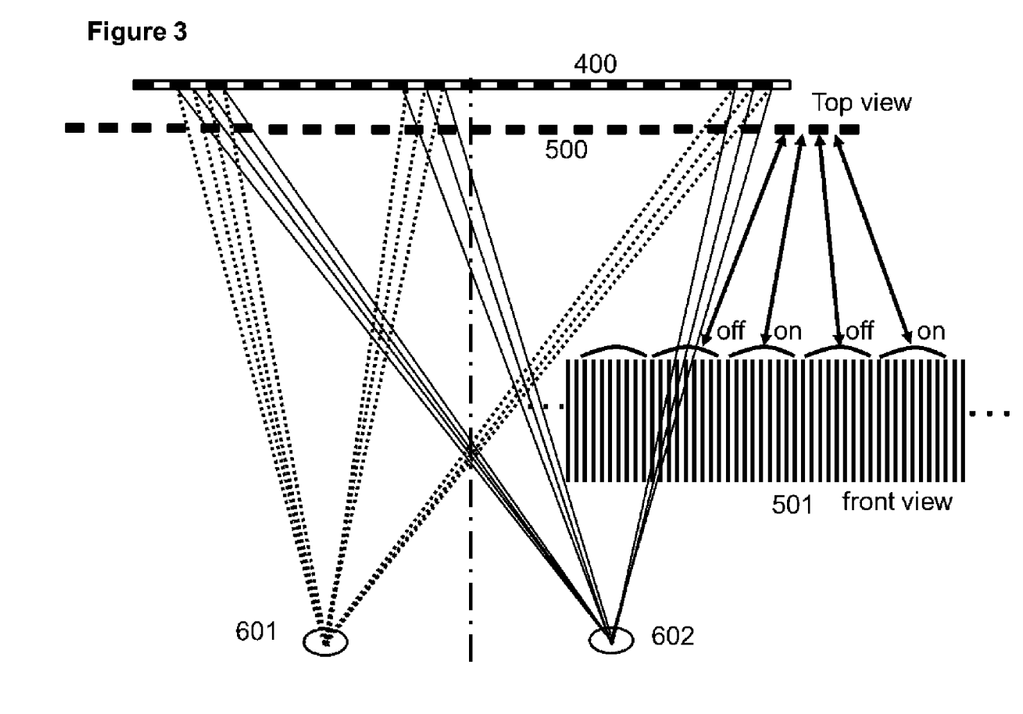

The display apparatus is picture scans device 400 or 400' (i.e. 2D image signal is scanning over the pixels on the picture scan device, or called signal pixel scan device to distinguish with shutter pixel scan device), and shutter apparatus is an 1D or 2D shutter grids 500 or 500' as shown in FIG. 3. The methods for playing-back 3D movie includes process, control system, and algorithms (as shown in FIGS. 4, 5, 6 and 7). There are built in two display modes: glass mode and glassless mode. The mentioned shutter is an optical switch, such as LCD, DMD, etc. but not limited to these.

[15] For glass mode, just keep all shutter grids at on status, and display movie as same way as current industry method for displaying 3D movie. The glass switch signal is transmitted from display apparatus by either a wire connection or by wireless connection.

[16] For the glassless mode, the apparatus and method are described below in details.

Method and Algorithm for Glassless 3D Playing-Back

[17] There are two methods for glassless playing-back 3D movie.

(1) Method I and its Algorithm

[18] In method I, image signal pixel-scanning-device 400 displays re-combined [rather than direct left eye or right eye picture, which is called un-combined] 3D movie picture from the process and control system, where the black part on device 400 indicates the picture stripe of left-eye movie for left eye 601, and the white part on pixel device 400 indicates the picture stripe of right-eye movie for right eye 602. Each signal pixel on pixel scanning device includes 3 or 4 sub-pixels for 3 or 4 colors. One picture stripe contains at least one (i.e. one or more, along vertical) signal pixel line. Shutter consists of 1-dimensional-shutter grids along vertical (i.e. column grid lines), and is divided into groups to form column grid stripes [501 shows the zoom-in view]. Each grid stripe contains at least one (i.e. one or more) grid lines controlled by synchronize signal from control system, in each of grid stripe, all grid lines will simultaneously switch on or simultaneously switch off the left eye part or right eye part of combined 3D movie picture, respectively.

Figure 4:
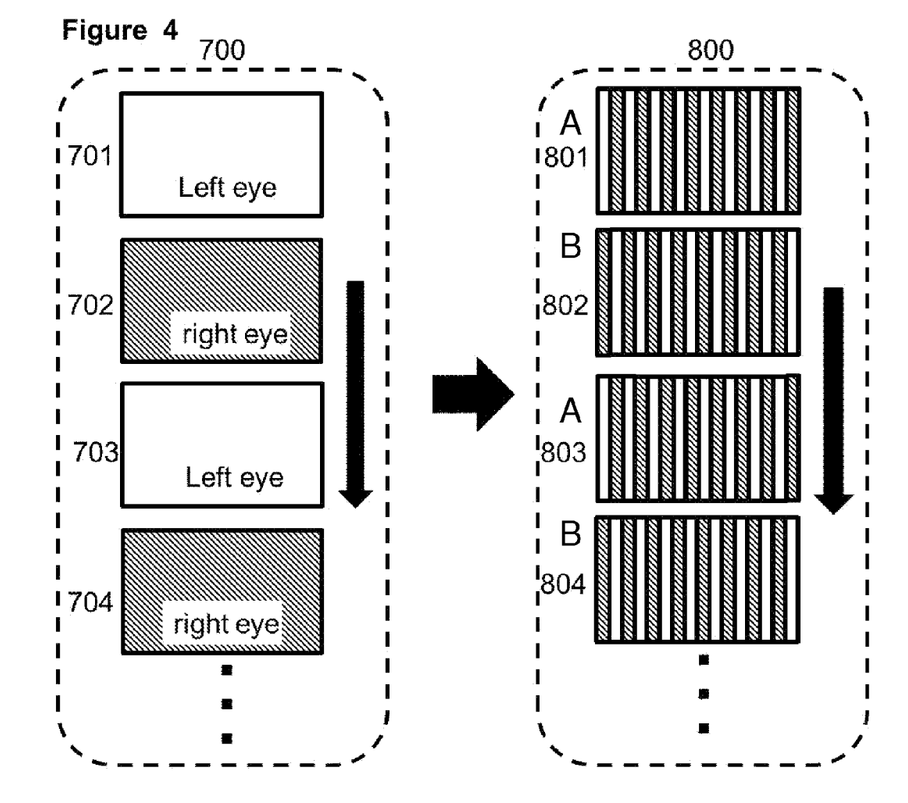

[19] As shown in FIG. 4, pictures of left eye 701, 703, . . . and pictures of right eye 702, 704, . . . are split into stripes and then stripe of left-eye-picture with stripe of right-eye-picture are combined into new frames of picture 801, 802, 803, 804, . . . according to the time sequence. There are two type of frames, type L (801, 803, . . .) with left-eye-picture stripe stating from left and type R (802, 804, . . .) with right-eye-picture stripe stating from left, The width of picture stripes can be constant or adjustable, which will be described in detail below.

Figure 5:
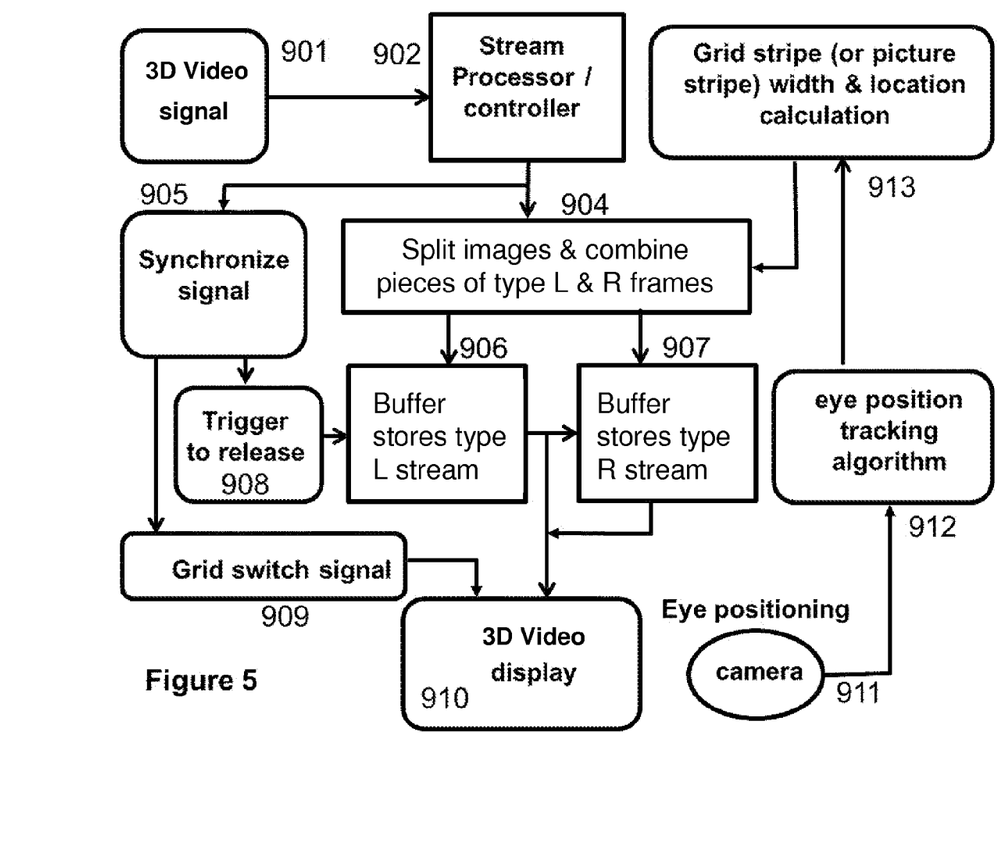

[20] There are two ways to select the width for shutter grid stripe. First way is constant width of shutter grid stripe (denoted as p=n*pixelSeparation), but adjusting (i.e. distributing from center to edge) the width of picture stripes according to the information from the algorithm calculation 913 based on shutter grid stripe location, and viewer eye locations. The second way is constant width of picture stripe (also denoted as p=n*pixelSeparation), but adjusting (i.e. distributing from center to edge) the width of each shutter grid stripe according to the information from the algorithm calculation 913 based on picture location and viewer eye locations. Obviously, the second way has lower cost.

[21] If the width of grid stripe in the shutter is fixed (but may have a distribution from center to edge), it is determined at setup using built-in software according geometries of the design (such as, dE, dV, dL, signal pixel size, location of this signal pixel line, . . . etc), user's eye distance and user's habits of viewing screen (far or close to screen). If width of grid stripe is dynamically adjusted, it is determined according to the dynamic situation of eye distance, eye locations, and screen distance to face, which are obtained from eye-tracking algorithm. So, this method has large tolerance to eye motion and viewer is able to avoid the sufferings from side effects of vertigo, headache, and eye fatigue.

[22] One of the examples of control system and process algorithm (actual control system and algorithm are not limited to this example) is shown in FIG. 5. Eye is tracked by camera 911, location-tracking algorithm 912 determines the locations of eyes. Default setup is: assume eyes are at optimized location (fixed location during watch). Before watching, viewer has two choices: using automatically eye tracking, or using fixed watching location. Of course, for the latter, the tracking camera can help the viewer setting or swinging head to a right location of which the information is displayed on screen before watching.

[23] As shown in FIG. 5, movie signal is transmitted from 3D TV source 901 to stream processor and controller 902, which transmits images signal to image splitting and combination unit 904, and meanwhile generates a synchronize signal 905 for releasing buffer and shutter switching. Unit 904 splits the pictures of left and right eyes into stripes and combine the stripes into new L and R type frames, as shown in FIG. 4. Then new L and R type frames are stored in buffers 906 and 907, respectively. At the beginning of display (during first two frames), the synchronize signal 905 needs to be properly delayed (leave enough time for unit 904 finishing it's job), then is sent to trig buffer 906 to release the signal stream of frame, and to display the picture of type L frame, meanwhile, sends synchronize signal to trig the shutter to open (switch on) shutter gird stripes for L type frame. Immediately after the display for type L frame is finished, buffer 906 sends trigger to buffer 907 to release the signal stream of frame to display the picture of type R frame, meanwhile, shutter grid stripes for R type frame are switched on (shutter grid stripes for L type frame are switched off). Buffers 906 and 907 store at least one pair of L & R frames (but can store many pairs of L & R frames). After the first two frames, synchronize signal 905 trigs frame buffers and shutter grid stripes periodically, and releases the frame stream and switch shutter grid stripes on time.

[24] Now let us talk about the theory on which the system design and algorithms are based. Let dE to be the two eye distance, dV to be the vertical distance between viewer's eye (601, 602) and shutter grids 500, dL to be the distance between pixel scanning device 400 and shutter grids 500, W to be width of display apparatus, Np to be the total horizontal pixel number such as 1920$p$, etc (so W=Np*pixelSeparation), then dL should be so designed that dL, p, and dV satisfy: p=dE*dL/[dV +e*dL], where e=+1 for the first way, and e=−1 for the second way. And dL should be determined by formula: dL=n*W*dV / [dE*Np−e*n*W], where n is pixel number in p, i.e p=n*pixelSeparation (center to center). Usually, dV is proportional to W, if we assume dV=q*W, then dL=n*q* W ^2/[dE*Np−e*n*W]. For the first way (constant width of shutter grid stripe), the width of picture stripe should be dX=p*(dV+dL)/dV, while for the second way (constant width of picture stripe), the width of shutter grid stripe should be dX=p*dV/(dV+dL). All geometry parameters above are in inches.

[25] To avoid the suffers from side effects of vertigo, headache, and eye fatigue, the eye tracking system, in real time, measures the dV (vertical distance between viewer's eye and shutter grids), dE and eye's relative motion to the display screen center, and then the eye tracking system adjusts dX and locations of shutter stripes. Different user has different dE. Therefore, at beginning, the dX is adjusted to p*[(dV+dL)/dV]^e. , after that, if distance dV is changing, then the stripe width dX will be automatically adjusted according to the formula above, i.e. dX=p*[( dV+dL)/dV]^e. If head of user swings (to left or to right) a distance dH relative to center of display screen, all shutter grid stripes ($2^{nd}$ way) or all picture stripes ($1^{st}$ way) should move dH*dL/[dV+e*dL] together. The left edge of shutter stripe is offset from the corresponding left edge of picture stripe xLi—ip=(ip+dE/2)*dL/dV for the $1^{st}$ way, or xLi—ip=−(ip+dE/2)*dL/(dV−dL) for 2nd way, where ip=i*p is the i-th pixel location. If there is only one eye-tracking camera, dH is determined from the correlation between two neighboring (in time sequence) tracking images by FFT (fast-Fourier transformation). If there are two eye-tracking cameras, dH is determined from the correlation between two neighboring tracking images (from any one of the two cameras) by FFT, and dV is determined by depth re-construction algorithm using left image from left camera and right image from right camera.

[26] To get the formula above, the following geometry lines need to be drawn: draw three neighboring signal pixel stripes on pixel scanning device 400 (any location is OK, but for more clear geometry relation, draw them at a location near right side of scanning device 400), say . . . L R L . . ., draw 4 lines from 4 edge points of the three stripes to center of right eye respectively, and draw 4 lines from 4 edge points of the three stripes to center of left eye respectively, then these 8 lines have many cross points, but there are 4 of the cross points are most close to pixel scanning device 400, draw a line connecting these 4 cross points and drawing extension of this line to both sides, which gives the position of shutter screen, and the separation between two neighboring points of the 4 cross points gives the width of shutter pixel stripe.

[27] For both ways, frame re-fresh rate of shutter grids is same as frame re-fresh rate of display picture. During the 2D scanning for each frame of display picture, the on/off states of shutter grid stripes is fixed. Here, we need to distinguish source picture refresh rate and display picture refresh rate. Display picture frames are obtained from two neighboring source picture frames by interpolating N frames in-between, for better-resolution looking, and display picture frames are actually displayed rather than source picture frames.

(2) Method II and its Algorithm

Figure 6:
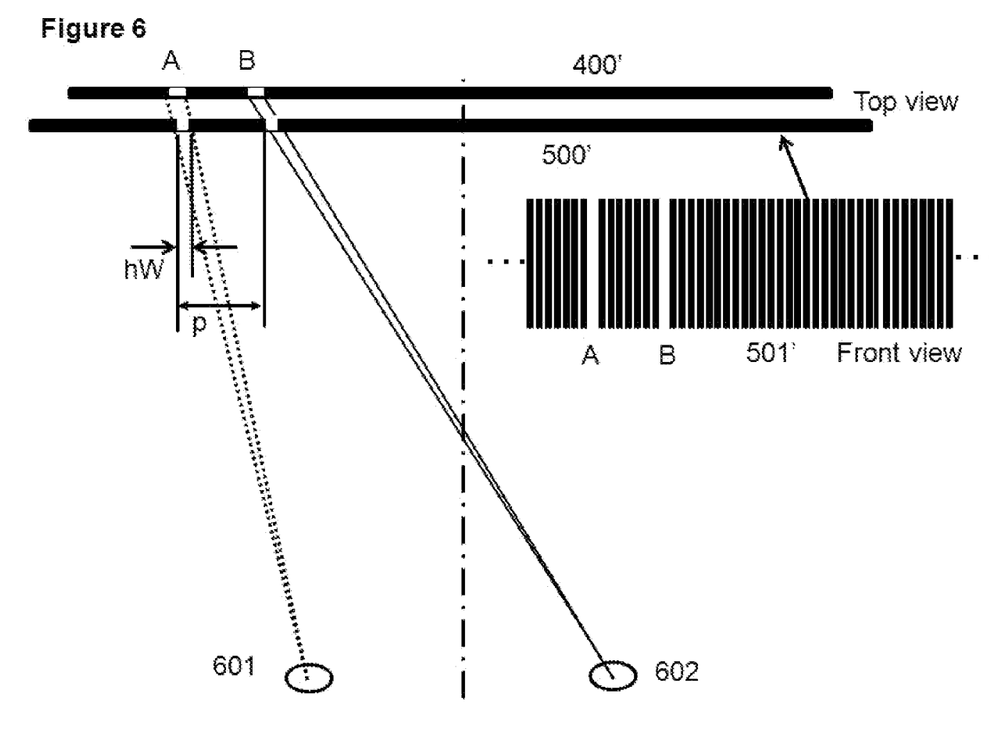
Figure 7:
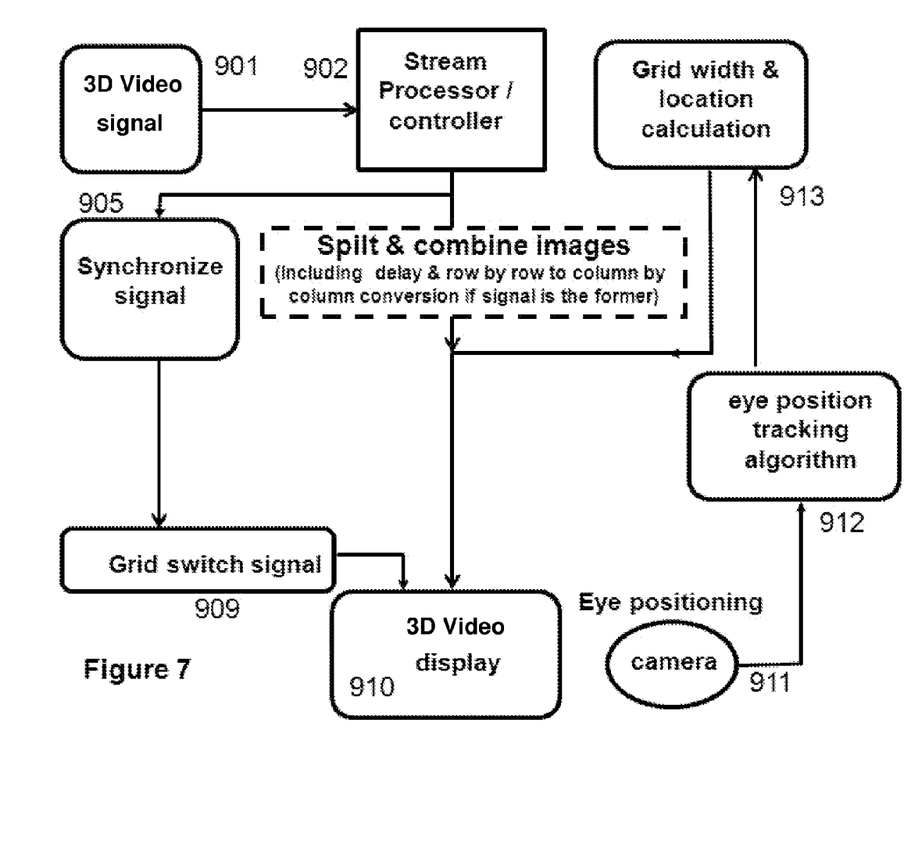

In the second method, as shown in FIGS. 6 and 7, the picture is not split into stripes (called un-combined pictures), but shutter lines are scanned with corresponding signal pixel lines together if using 1D shutter grid, i.e. when vertically (column) scaning to each pixel within each signal pixel line (column), all the corresponding stripe window(s) on the shutter screen are always on (i.e. all shutter pixel lines in these windows are switched on simultaneously, all other shutter lines are switched off) until end of current pixel line (column or vertical line), or start of next pixel line or column. Once the scan for whole left eye picture is finished, then switch the scan for right eye picture. If using 2D shutter grid, rectangular windows of shutter are scanned together with corresponding signal pixels, i.e. when the signal pixel at (i-th row, j-th column) is being scanned, all shutter grids in the corresponding rectangular windows are switched on simultaneously, and all other shutter grids are switched off).

If using 1D shutter grid, the each signal frame (if originally designed as scanning row by row) needs a so-called row to column conversion by unit 904, i.e. spitting and be re-combining in time sequence, so as to change "scanning row by row" to "scanning column by column". However, if 2D shutter grid, there is no need of row to column conversion.

There are also two ways to scan. The first way is to set the density of shutter grids as same as designed spec (i.e. fixed width and pitch of shutter screen), but picture pixel grid may has same or higher density than designed spec; The second way is to set the density of picture pixel grids as same as designed spec (i.e. fixed width and pitch of image screen), but shutter grid may has same or higher density than designed spec, Obviously, the second way has lower cost.

For the first way (shutter grids as designed spec), the theoretic center location of picture pixel or picture stripe for left eye is xL(i)=i*pixelSeperation+[i*pixelSeperation+ dE/2]*dL/dV (left eye)

xR(i)=i*pixelSeperation+[i*pixelSeperation− dE/2]*dL/dV (right eye)

and dL should satisfy: dL>=dV*hW /[dE−hW−vR], where vR is the tolerant range for eye motion or viewer head swinging. If the width of stripe window in the shutter is fixed by setup, then a larger vR is needed at design (if the width is adjustable, vR can be very small). If there is more than one pixel line in picture stripe, the width of picture stripe is determined by dX=hW+[hW+vR]*dL/dV. If for multiple viewers with simultaneously multiple-zone-scanning to increase the brightness and reduce the bandwidth, the allowed minimum shutter window pitch should satisfies ph>[hW+(dL/dV)*(dE+vR+hW]/[1+(dL/dV) ].

[32] To get the formula above and below, the following geometry lines need to be drawn: draw one picture stripe on pixel scanning device 400', draw one line L1 to connect right edge of the stripe with the tolerant limit for leftward-off-set of left eye, draw another line L2 to connect left edge of the stripe with the tolerant limit for rightward-off-set of left eye, then L1 and L2 have one cross point; If denote the distance from this cross point to pixel scanning device 400' as dLO, then draw an line parallel to device 400' and with distance 2*dLO from device 400'. For 1st way (smaller shutter hole or window) described above, the shutter screen 500' can be set at a distance less than 2*dLO from device 400'. For 2nd way (larger shutter hole or window) described below, the shutter screen 500' can be set at a distance greater than 2*dLO from device 400', and the width of shutter stripe window hW is determined by the distance of two cross points of shutter screen 500' with two lines L1 and L2.

[33] For the second way (picture pixel as designed spec), the theoretic center location of shutter line or shutter window (if more than one lines in thr stripe) for left eye is xL(i)=[i*pixelSeperation—(xN+dE/2)*dL/dV]/ 1+dL/dV), the theoretic location of picture pixel for right eye is xR(i)=[i*pixelSeperation—(xN−dE/2)*dL/dV]/(1+dL/dV), where xN is the nose center location (location of middle line between eyes) relative to center of display screen. Width of shutter stripe window is determined by hW=[vR*dL/dV−p]/(1+dL/dV). And dL must satisfies dL>dV(hW+p)/(vR−hW). Again, p is the picture pixel width or width of picture stripe (if more one pixel lines in the stripe). If for multiple viewers, simultaneously multiple-zone-scanning can be also used to increase the brightness and reduce the bandwidth.

[34] Eye tracking algorithm for method II is same as described above for method I.

[35] When width of picture pixel is close to the width of shutter grid, there will be so called grid mismatch problem, i.e. edge of picture pixel is offset from edge of shutter grid. Grid mismatch problem will reduce the picture quality. However, if shutter grid density (vertical or column line density) is 2~10 (5 may be good enough) times of column line density of picture, there will be no mismatch problem.

What is claimed is:

1. A method for extending 3-dimensional view-depth of 3D video recording and playing back on an intelligent device to increase the view depth beyond human eye capability, comprises the following steps:
   (1) producing extension for the location of one camera in camera pair for 3D video recording;
   (2) integrating the said extension with the said intelligent device for both 3D video recording and playing back with extended view-depth for wider applications;
   (3) recording 3D video with extended view-depth; and
   (4) playing back recorded 3D video with extended view-depth; wherein, the said intelligent device being referring to any one of cell-phone, PDA, iPhone, iPad, Google Glass, pocket PC or tablet, GPS, eBook, laptop or notebook, monitors of desktop computer, TV or iTV; wherein, the 3D display of intelligent device with said extension for playing back being not necessarily to limit to case of glassless display, and being not necessarily to limit to the case which needs a camera for eye tracking; wherein the (means of) recording 3D video with extended view-depth comprises at least one of:
   (1) determine camera-separation in camera pair from the depth of scene using relation: (separation of approximately 30 feet)*(camera-distance/8 cm);
   (2) pulling out extension from intelligent device to a proper distance according to required camera-separation;
   (3) adjusting numerical and optic focus of two cameras in camera pair simultaneously during 3D recording; and
   (4) adjusting view-angles of two cameras in camera pair simultaneously during 3D recording; wherein, data of right eye pictures and left eye pictures is stored in predetermined format such as in separate data files, alternately in one data file, in industry standard format(;), and in predefined 3D movie format.

2. The method of claim 1, wherein the (means of) producing extension comprises at least one of :
   (1) providing link by single level mechanic extension;
   (2) providing link by multiple levels of mechanic extension to further increase view-depth;
   (3) providing link by optical fiber extension with off-device camera;
   (4) providing link by RF cable extension and RF wire extension with off-device camera; and
   (5) providing link by RF wireless extension with off-device camera; wherein the said link of extension with off-device camera and link of mechanic extension providing flexible location for one of the cameras in camera pair and providing signal connection between said camera and intelligent device.

3. The method of claim 2, wherein the next level of extension of said multiple levels of mechanic extensions being installed on a previous level extension, being able to pulled into and out from the previous level of extension, and being rotatable about one end of the previous level of extension when necessary.

4. The method of claim 1, wherein said mechanic extension together with one camera of camera pair being integrated with intelligent device, said extension being able to be pulled out from and into intelligent device and able to adjust the distance of two cameras of camera pair, and one camera of camera pair being installed at one end of said extension, the other end of said extension being fixed on said intelligent device and being rotatable when necessary.

5. The method of claim 1, wherein playing back recorded 3D video with extended view-depth comprises:
   (1) providing system design for 3D display; and
   (2) providing algorithms for stream control of 3D display.

6. The method of claim 5, wherein the algorithms for stream control of 3D display with extended view-depth comprises at least one of the following steps:
   (1) transmitting a movie signal from 3D video source to a stream processor and controller;
   (2) transmitting images signal using the stream processor and controller to image split and combination unit, and meanwhile generating a synchronized signal for releasing buffer and switching shutter;
   (3) calculating picture stripe width and shutter grid stripe width from eye-tracking result and design formula using the stream processor when eye-tracking system is included;
   (4) splitting the pictures of left and right eyes into stripes and combine the stripes into new left-type frames and right type frames using a split and combination unit;

(5) converting the picture format from row-by-row scan to column-by-column scan using the stream processor when directly using original left and right pictures rather than using combined pictures;

(6) storing new left-type frames and right type frames in two buffers respectively, wherein(,) during first two frames of display, the synchronize signal being properly delayed so that leaving enough time for split and combination unit to finish the job;

(7) synchronizing a signal triggering the left buffer which stores a left-type stream to release the signal stream of the left-type frame, and to display the picture of left-type frame, meanwhile, synchronize signal trigging the shutter to open shutter grid stripes for left-type frame;

(8) storing a right-type stream in the right buffer being triggered to release the signal stream of right-type frame to display the picture of type right-type frame, immediately after finishing the display of left-type frame(,); meanwhile, shutter grid stripes for right-type frame being switched on and shutter grid stripes for left-type frame being switched off; and (9) synchronizing the signal after the first the first two frames, and triggering left buffer, right buffer, and shutter grid stripes periodically, releasing (the) a frame stream and switching shutter grid stripes on time.

7. The method of claim 5, wherein the algorithms for re-combined 3D video pictures with extended view-depth comprises:

$$p*[dV+e*dL]=dE*dL;$$

$$dX=p*[(dV+dL)/dV]\char`\^e \text{; and}$$

$$dL=n*dV*W/[dE*Np-e*n*W];$$

wherein, dE stands for the distance of two eyes, dV stands for the distance between viewer and screen of shutter grids, W stands for width of display apparatus, Np stands for the total horizontal pixel number which means W=Np*pixelSeparation, n stands for number of pixels in a shutter grid stripe or in a picture stripe, p=n*pixelSeparation; wherein, for the design of constant shutter grid stripe width, e=+1, p being the width of shutter grid stripe, and dX being the width of picture stripe; wherein, for the design of constant picture stripe width, e=−1, p being the width of picture stripe, and dX being the width of shutter grid stripe, ^s stands for power calculation.

8. The method of claim 5, wherein the algorithms for stream control of unsplit 3D video pictures with extended view-depth comprises at least one of the following steps:

(1) converting left-eye and right-eye pictures into column-by-column scan format from row-by-row scan format when original pictures being in row-by-row format;

(2) vertically scanning each image pixel within a picture stripe which is image pixel column line;

(3) during scanning to each picture stripe , all the corresponding shutter stripe windows on the shutter screen being always on, which means all shutter pixel lines in these windows being switched on simultaneously, all other shutter lines being switched off, until end of current image pixel line;

(4) scanning next image pixel column line and repeating until whole left eye picture being scanned; and (5) scanning for right eye picture and repeating;

wherein, simultaneously multiple-zone-scanning being used to increase the brightness when necessary.

9. The method of claim 5, wherein the formula of system design for unsplit 3D video pictures with extended view-depth comprises:

for fixed pitch of shutter screen, determining center location of picture stripes by $$xL(i)=i*\text{pixelSeperation}+[i*\text{pixelSeperation}+dE/2]*dL/dV \text{ (left eyes)},$$

$$xR(i)=i*\text{pixelSeperation}+[i*\text{pixelSeperation}-dE/2]*dL/dV \text{ (right eyes)},$$

and determining width and pitch of picture stripes by $$dX=hW+[hW+vR]*dL/dV;$$

for fixed pitch of image screen , determining center location of shutter windows by:

$$xL(i)=[i*\text{pixelSeperation}-(xN+dE/2)*dL/dV]/(1+dL/dV) \text{ (left eyes)},$$

$$xR(i)=[i*\text{pixelSeperation}-(xN-dE/2)*dL/dV]/(1+dL/dV) \text{ (right eyes)},$$

and determining width of shutter windows by $$hW=[vR*dL/dV-p]/(1+dL/dV);$$

wherein, xN being the location of middle line between eyes relative to center of display screen, vR being the tolerant range for eye motion or viewer head swinging, i is the index of picture stripes or shutter windows.

* * * * *